(12) United States Patent
Johansson et al.

(10) Patent No.: US 9,248,631 B2
(45) Date of Patent: Feb. 2, 2016

(54) METHOD OF CONTROLLING WORKING OPERATION OF A FILLING MACHINE

(75) Inventors: Hans Johansson, Lomma (SE); Lars Bergholtz, Höganäs (SE); Lotta Klint, Löddeköpinge (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 618 days.

(21) Appl. No.: 13/051,300

(22) Filed: Mar. 18, 2011

(65) Prior Publication Data

US 2011/0162326 A1   Jul. 7, 2011

Related U.S. Application Data

(62) Division of application No. 12/700,822, filed on Feb. 5, 2010, now Pat. No. 7,958,694, which is a division of application No. 10/512,582, filed as application No. PCT/SE03/00757 on May 9, 2003, now abandoned.

(30) Foreign Application Priority Data

May 10, 2002   (SE) ....................................... 0201419

(51) Int. Cl.
*B26D 7/27*   (2006.01)
*B32B 27/20*   (2006.01)

(52) U.S. Cl.
CPC ............. *B32B 27/20* (2013.01); *B65D 2203/00* (2013.01); *Y10T 428/25* (2015.01); *Y10T 428/256* (2015.01)

(58) Field of Classification Search
CPC .................................................... B32B 27/20
USPC ........... 53/396, 51, 52, 53, 65; 493/16, 11, 12
See application file for complete search history.

(56) References Cited

U.S. PATENT DOCUMENTS

| | | |
|---|---|---|
| 2,393,541 A | 1/1946 | Kohler |
| 3,188,266 A | 6/1965 | Charbonneau et al. |
| 4,198,458 A | 4/1980 | Mitsuishi et al. |

(Continued)

FOREIGN PATENT DOCUMENTS

| | | |
|---|---|---|
| DE | 3608961 A1 | 11/1986 |
| EP | 0131241 A2 | 1/1985 |

(Continued)

*Primary Examiner* — Sameh Tawfik
(74) *Attorney, Agent, or Firm* — Buchanan Ingersoll & Rooney PC

(57) ABSTRACT

A packaging laminate includes at least one material layer provided with magnetizable particles. A roller can be configured to apply crease line patterns on the packaging laminate while also applying magnetic fields for magnetizing at least some of the magnetizable particles in the packaging laminate. A method of controlling working operations on a packaging laminate in a filling machine involves supplying a packaging laminate to a filling machine, wherein the packaging laminate includes at least one material layer comprising magnetizable particles, with at least some of the magnetizable particles being magnetized particles. The method also involves controlling working operations of the filling machine on the packaging laminate supplied to the filling machine by reading information provided by the magnetized particles.

12 Claims, 5 Drawing Sheets

(56) References Cited

U.S. PATENT DOCUMENTS

| | | | |
|---|---|---|---|
| 4,258,100 | A | 3/1981 | Fujitani et al. |
| 4,371,364 | A | 2/1983 | Rausing |
| 4,387,614 | A | 6/1983 | Evans |
| 4,415,978 | A | 11/1983 | Craemer et al. |
| 4,455,810 | A | 6/1984 | Kreager et al. |
| 4,749,625 | A | 6/1988 | Obayashi et al. |
| 4,774,148 | A | 9/1988 | Goto |
| 4,785,750 | A | 11/1988 | Best |
| 4,792,392 | A | 12/1988 | Belgian |
| 4,945,252 | A | 7/1990 | Lerner et al. |
| 5,255,055 | A | 10/1993 | Mahoney |
| 5,316,857 | A | 5/1994 | Spiegel |
| 5,458,062 | A * | 10/1995 | Goldberg et al. ............. 101/485 |
| 5,503,891 | A | 4/1996 | Marshall et al. |
| 5,512,125 | A | 4/1996 | Momot et al. |
| 5,762,263 | A | 6/1998 | Chamberlain, IV |
| 5,873,966 | A | 2/1999 | Goldberg et al. |
| 5,985,435 | A | 11/1999 | Czaplicki et al. |
| 6,085,903 | A | 7/2000 | Jotcham et al. |
| 6,949,275 | B2 | 9/2005 | Johansson |
| 7,222,472 | B2 | 5/2007 | Spatafora et al. |
| 7,765,773 | B2 | 8/2010 | Nilsson et al. |
| 2002/0061806 | A1 | 5/2002 | Raueiser |
| 2002/0081446 | A1 | 6/2002 | Boudouris et al. |

FOREIGN PATENT DOCUMENTS

| | | |
|---|---|---|
| EP | 0317879 A1 | 5/1989 |
| JP | 10219003 | 8/1998 |
| JP | 10329285 | 12/1998 |
| JP | 2002096431 | 4/2002 |
| WO | WO 0112743 A1 | 2/2001 |

\* cited by examiner

METHOD OF CONTROLLING WORKING OPERATION OF A FILLING MACHINE

This application is a divisional of U.S. application Ser. No. 12/700,822 having a filing date of Feb. 5, 2010, which is a divisional of U.S. application Ser. No. 10/512,582 having a filing date of Apr. 19, 2005, which is a U.S. national stage application based on International Application No. PCT/SE03/00757 having an international filing date of May 9, 2003, and claiming priority to Swedish Application No. 0201419-9 filed on May 10, 2002, the entire content of all of which is incorporated herein by reference.

TECHNICAL FIELD

The present invention relates to a packaging laminate. The present invention further relates to a creasing roller including means for applying crease line patterns on a packaging laminate, as well as to a layer for use for a packaging laminate.

BACKGROUND ART

Within, for example, the printing and packaging industries, it is common practice to control working operations on a continuous material web by providing guide markings by means of printing on the web, these guide markings being sensed by photocells or other optical devices. These markings or control markings are often printed in a colour tone which makes a clear contrast with its surroundings, preferably black, and is applied on such panels or areas of the material web where no other printed markings or patterns occur. The markings may also be provided by means of magnetically sensible material or with the aid of mechanically sensible markings such as, for example, holes, crease lines or slots.

These guide markings are employed, for example, in the printing of multi-colour print, to adapt the position of the patterns printed with different colours to one another so that the different colour patterns will lie exactly superposed on one another. Another similar field of use is when the intention is, on a previously ready printed material web, to add print at a predetermined place in the print pattern, for example a best before date or the like or when the intention is to provide a printed pattern and a crease line pattern which facilitate fold forming, in register with each other.

Further fields of use are, for example, in those cases where the intention is, in a filling machine or the like, to advance a packaging material web an exact pattern length in order, on the one hand, to have the printed pattern in the same position on all packages, and, on the other hand, to cause the above mentioned crease line pattern to register with the forming devices of the filling machine so that the folding of the material takes place along the crease lines which are predetermined in position.

One example of such a guide marking is described in EP-A-131 241. One drawback inherent in this type of guide marking is that the marking takes up a certain area, which cannot then be provided with decorative artwork. Another drawback is that mechanical action runs the risk of scratching the mark, with the result that the detector intended for the purpose does not correctly register the guide marking. A further problem which may arise in the employment of the above-mentioned type of guide marking is that the guide marking is used for controlling the creasing machine and that the guide marking is then also used for controlling the filling machine. This implies that any possible tolerance errors in the positioning of the crease line pattern in relation to the guide marking and on the detection and forming by the filling machine may, in the worst case scenario, be added to one another, which could result in the filling machine attempting to fold the packaging material at the incorrect place in relation to the crease line pattern. The above-outlined problems are minimised according to current technology by means of finely tuned manufacturing machines and filling machines and by means of caution in the handling of the packaging material.

In this context, mention should also be made of EP-A-317 879 which briefly describes the employment of a magnetic guide marking in the form of magnetic strips placed on the packaging material. The publication relates to the design of the magnetic detector and is totally silent as to the design and construction of the magnetic guide marking. The magnetic strip placed on the packaging material is, precisely like the optically detectable guide marking, associated with problems in respect of tolerance errors in positioning and in subsequent processing operations of the packaging material. In addition, it may also be subjected to scratching. Moreover, there are numerous magnetic sources of disruption in a filling machine of conventional type, which impedes a correct detection of the position of the packaging material in the filling machine. The latter problem has been addressed in the last-mentioned publication in that the detector has been given a specific design.

SUMMARY

The disclosure here provides an alternative solution to the above-mentioned functioning of a guide marking.

A packaging material of the type described by way of introduction includes at least one material layer comprising magnetisable particles.

By employing a layer with magnetisable particles, it is possible to magnetically read off a guide marking even if this is not located outermost, in other words it is possible to print decorative artwork on the entire surface of the packaging container without needing to leave any surface free for the guide marking. Moreover, the risk is reduced that the marking be damaged by external mechanical effects. Since, according to the present invention, the formation of the decorative artwork of the package has thus been separated from the formation of the information-carrying guide marking, it is further conceivable to employ the total surface of the packaging container as an information carrier, which entails that the packaging laminate and the package may be provided with considerably more information than in prior art systems.

A further advantage which is afforded is that it is relatively simple to integrate the production stage of providing the packaging laminate with the crease line pattern with the production stage of magnetising the particles. If it is chosen to utilise this advantage, it is possible to eliminate error tolerances between the guide marking and the crease lines, which entails that it is the settings of the filling machine which are determinative of the tolerances between the positioning of the guide marking and the actual forming of the packages.

The intended magnetisable particles retain their magnetic charge (magnetic remanence) even when they are no longer influenced by the magnetic field. The time interval which is relevant to consider for the particles to be deemed to be permanently magnetisable (residual magnetism for a sufficiently long time) naturally varies depending upon the intended application. If the information which is stored by means of the particles is intended for controlling the filling machine, the information must have sufficiently good quality during the time it takes to transport and store the material until such time as it is employed in the filling machine. If the intention is to provide information which is employed by the retail outlet which sells the package, the relevant time limit is consequentially extended. It is further conceivable that the relevant time limit is further extended if the information which is magnetically stored is also intended to be employed in connection with recycling of the packages or the like. The charge of the magnetisable particles may be modified in that a new magnetic field is applied. Thus, it is, for example, conceivable that the filling machine reads off the original information in order to control the formation operation correctly, whereafter the machine writes over with new information in respect of product batch, product type, packing date or the like which is intended to be used by the retail outlet or for tracing the package.

Preferred embodiments will be apparent from the description below.

According to one preferred embodiment, the packaging laminate comprises a layer with a basic matrix of plastic, the above mentioned magnetisable particles being admixed in the basic matrix. In terms of production engineering, this is a preferred embodiment, since the methods which are employed for manufacturing plastic layers are suitable for admixing particles into the plastic matrix.

According to yet a further preferred embodiment, the above mentioned basic matrix is a thermoplastic, preferably a polyolefin plastic. Thermoplastics, and in particular polyolefin plastics, are suitable to use in packaging laminates and are moreover suitable for admixing of particles from the point of view of production engineering.

Advantageously, the above mentioned particles are metallic, since they possess superior magnetic properties (they are relatively easy to magnetise and display a satisfactory magnetic remanence).

Also disclosed here is a roller of the type described by way of introduction which is outfitted with means for applying magnetic fields for magnetising magnetisable particles in the packaging laminate.

By applying the crease line pattern and the magnetic guide marking using one and the same roller, it has been possible to totally eliminate error sources which otherwise occur on reading off of the guide marking in the conventional crease roller. By employing one and the same roller, it is only manufacturing tolerances, if any, for the roller proper which give rise to an error. The packaging laminate according to the present invention with magnetisable particles makes it possible, in a relatively simple manner, to integrate the creasing with the application of the magnetic guide marking. Combining printing with creasing is considerably more difficult, since the printing requires a smooth roller in abutment with the packaging material while the creasing requires a roller with projecting portions.

Also disclosed is a layer for use for a packaging laminate, the layer including magnetisable particles. By prefabricating a separate layer with magnetisable particles, it is possible to optimise the production process for this step in principle independently of the manufacture of the finished packaging laminate. Since modifications in lamination plants require costly capital investments, it is desirable if it be possible to utilise the present invention in conventional lamination plants without major retroconstruction being required. Prefabricating a layer which is subsequently laminated together with remaining layers in the packaging laminate is one method of avoiding excessively large retroconstruction of the lamination process. Such a separate layer may also be employed for various types of labels. For examples labels for cans or so-called shrink on labels for various types of bottles.

An apparatus for carrying out a working operation on a laminate includes means for carrying out the above mentioned working operation, and the apparatus further including means for applying a magnetic field for magnetising magnetisable particles in the laminate. By carrying out the working operation and applying the magnetic guide marking or other information using one and the same item of equipment, it has been possible to completely eliminate the error source which otherwise occurs when reading off the guide marking in conventional sequential working operations. By employing one and the same item of equipment, it is only manufacturing tolerances, if any, for the equipment which give an error. The packaging laminate according to the present invention with magnetisable particles makes it possible, in a relatively simple manner, to integrate different working operations with the application of the magnetic guide marking or other information. Examples of such integrated working operations may be punching of semi-manufactured plastic bags at the same time as the punch carries magnetic devices for applying a magnetic marking in register with the punching operation. Other working operations where it might be appropriate to apply the magnetic information simultaneously as the operation is carried out are, for example, the welding of joints in semi-manufactured plastic bags, printing of various types of laminates, or other processing operations such as embossing, perforation or the like. The combination between the magnetisation and the processing operations can, of course, be carried out in systems with rollers, but also other systems which, for example, employ flat plates for realising welding, punching, printing or other similar working operations.

Also disclosed is a method of controlling working operations on a packaging laminate in a filling machine. The method involves supplying a packaging laminate to a filling machine, with the packaging laminate comprising a plurality of material layers. At least one of the material layers included in the packaging laminate comprises a layer of fibre-based material and at least one other of the material layers comprises magnetizable particles, with at least some of the magnetizable particles being magnetized particles. The method also involves controlling working operations of the filling machine on the packaging laminate supplied to the filling machine by reading information provided by the magnetized particles.

BRIEF DESCRIPTION OF THE DRAWINGS

The present invention will now be described in greater detail hereinbelow, with reference to the accompanying schematic Drawings which, for purposes of exemplification, show currently preferred embodiments of the present invention. In the accompanying Drawings.

DETAILED DESCRIPTION

Figure 1:
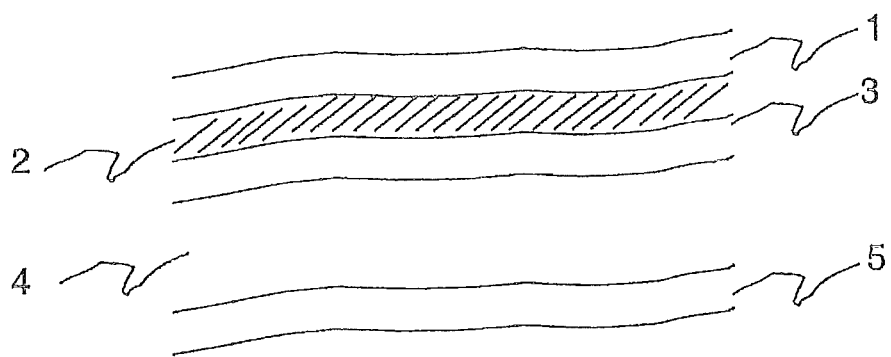
FIG. 1 shows a laminate structure for a rigid, fibre based package adapted for refrigerated distribution.

As is apparent from FIG. 1, the packaging laminate comprises, according to a first embodiment, counting from that side which is intended to constitute the outside of a finished package, a sealing layer 1, for example of polyethylene plastic (PE), an information layer 2 of mineral filled thermoplastic (for example a polyolefin plastic) with admixed magnetisable particles, a lamination layer 3 of, for example, PE, a core layer 4 of a fibre-based material, as well as a sealing layer 5 of, for example, PE. This packaging laminate is adapted for refrigerated distribution.

One example of a suitable mineral-filled polyolefin layer 2 comprises a basic matrix of polyolefin with inorganic mineral particles admixed in the basic matrix in a quantity of from 5 to 85% of the total weight of the mineral-filled polyolefin layer.

Examples of usable inorganic mineral particles are dolomite, talcum, chalk, mica, limestone, marble, kaolin and wollastonite. Preferably, the inorganic mineral particles are a mixture of dolomite- and talcum particles in which the quantity of dolomite particles is between 70 and 90% and the quantity of talcum particles is between 10 and 30%, calculated on the weight of the mixture.

Preferably, the basic matrix of the mineral-filled polyolefin layer consists of a propylene-based polyolefin, such as, for example, a propylene homopolymer or a copolymer of propylene and ethylene and/or other alkylene. An example of a propylene-based polyolefin could be propylene homopolymer with an ASTM melt index of under 10 (2.16 kg; 230° C.) or a copolymer of propylene and ethylene and/or other alkylene with an ASTM melt index of 0.5-5 (2.16 kg; 230° C.).

Figure 2:
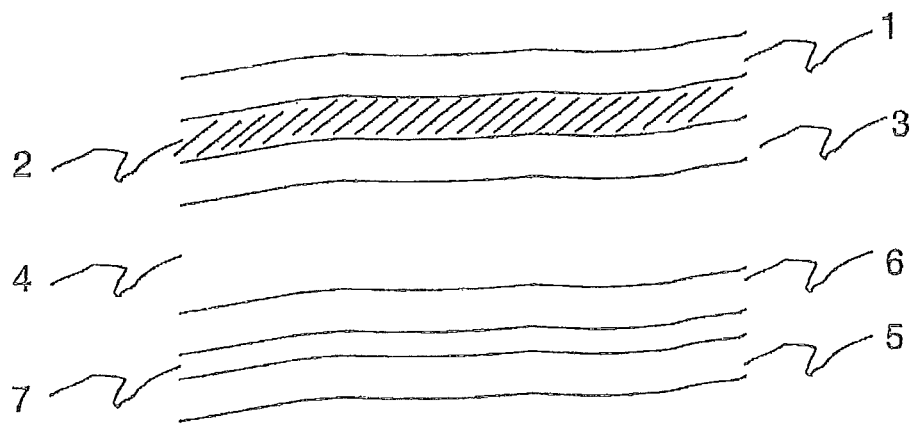
FIG. 2 shows a laminate structure for a rigid, fibre based package adapted for non-refrigerated distribution, a so-called aseptic package.

As is apparent from FIG. 2, the packaging laminate comprises, according to a second embodiment, the same layers as in the first embodiment, as well as a lamination layer 6 of, for example, PE and a barrier layer 7 of, for example, aluminium foil between the core layer 4 and the innermost sealing layer 5. The lamination layer 6 is located between the barrier layer 7 and the core layer 4. This packaging laminate is adapted for non-refrigerated distribution.

Both of these packaging laminates are intended to be formed into rigid packages possessing well-defined configurations. For example, right parallelepipedic packages may be produced from these two packaging laminates. Two laminate structures for so-called bags will be described below.

Figure 3:
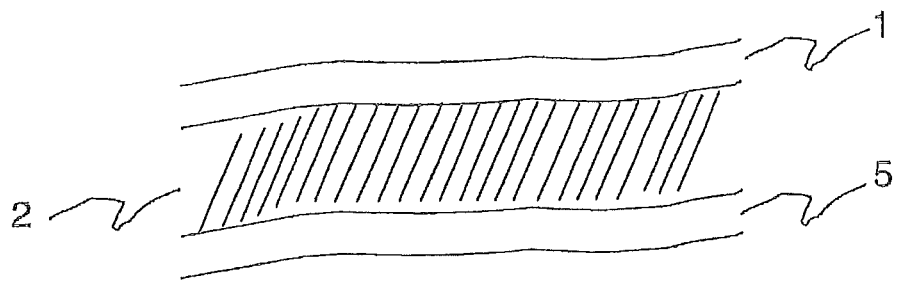
FIG. 3 shows a laminate structure for a bag-shaped package adapted for refrigerated distribution.

According to a third embodiment, the packaging laminate comprises, as is apparent from FIG. 3 and seen from the side which is intended to constitute the outside of a finished package, a sealing layer 1 of, for example, PE, an integrated information and core layer 2 of mineral-filled thermoplastic with admixed magnetisable particles, as well as an inner sealing layer 5 of, for example, PE. This packaging laminate is adapted for refrigerated distribution.

The integrated core layer 2 is preferably of the same type as was described in connection with the first embodiment, i.e. a mineral-filled polyolefin layer.

Figure 4:
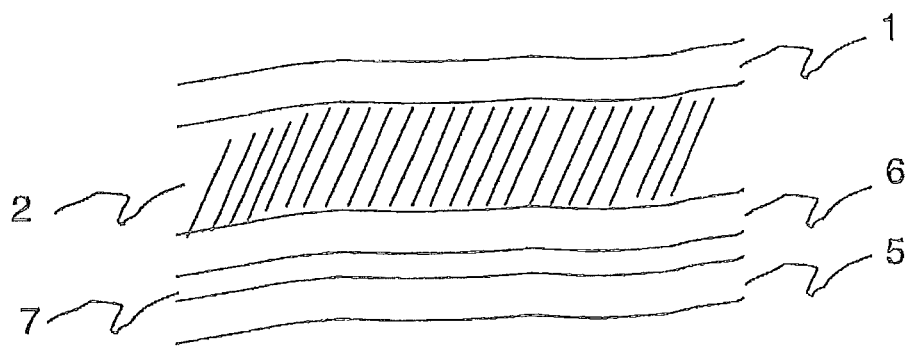
FIG. 4 shows a laminate structure for a bag-shaped package adapted for non-refrigerated distribution.

As is apparent from FIG. 4, the packaging laminate comprises, according to a fourth embodiment, the same layers as in the third embodiment, as well as a lamination layer 6 of, for example, PE and a barrier layer 7 of, for example, aluminium foil between the core layer 2 and the innermost sealing layer 5. The lamination layer 6 is located between the barrier layer 7 and the core layer 2. This packaging laminate is adapted for non-refrigerated distribution.

Examples of metallic materials which may be employed for the magnetisable particles are chromium oxide, iron oxide, titanium, manganese or mixtures thereof. According to one example, use is made of substantially spherical particles having a diameter of approximately 0.5 µm. Experiments have proved that but limited quantities of magnetisable particles are needed. It has also proved that the requisite admixing degree reduces with the thickness of the particle-carrying layer. The requisite admixing degree is also effected by the number of sources of disturbance which exist around the site where the information is to be read-off. Further, the requisite quantity of particles is also influenced by the distance at which it is to be possible to read the information, i.e. if the reading device can abut against the material or if there is an air gap or some other material layer between the information layer and the reading device. Trials with simple equipment have shown that a plastic film containing approximately 0.1 weight percent of magnetite can be read without difficulty at a distance corresponding to a paper layer when the film has a thickness of approx. 50 µm. Theses trials have moreover been carried out in a conventional filling machine where the information has been employed to realise guiding of the web. With corresponding simple equipment, it is possible to reduce the level to 0.01 weight percent if the measurement is carried out outside the filling machine. For a plastic bottle with a ten times as thick layer, approximately a tenth of this admixing level can be employed. Moreover, the quantity may be reduced if the reading-off operation may be carried out directly adjacent the layer. If, moreover, it is possible to eliminate sources of disturbance or compensate for known sources of disturbance, it is possible to reduce the quantity of particles even further. In addition, the quantity of particles may be further reduced for applications where the design and construction can support a higher equipment cost, i.e. in those cases where it is possible to employ the same type of reader head as is disposed in a hard disk for a computer. Under these conditions, it is possible to employ admixing quantities down to approximately 1 ppm (parts per million) and nevertheless obtain a detectable and technically usable information quantity.

The upper limit in respect of the quantity of admixed magnetic particles is determined int. al. by how much that can be mixed into the plastic without its other properties (in addition to magnetic behaviour) being changed excessively. For example, difficulties may arise with homogenous admixture or excessively powerful blackening of the material. Trials have demonstrated that admixtures of 1 weight percent and 10 weight percent do not influence the admixture to any major extent. There are also other similar particles which are mixed into plastics for other purposes which may be admixed in quantities of up towards 90 weight percent without the admixture being disturbed to too great an extent. However, in certain cases blackening is powerful at 1 weight percent and excessively powerful at 10 weight percent.

A method of manufacturing the plastic with admixed magnetic particles is so-called compounding in which the thermoplastic is molten and mixed with minerals and additives. The magnetisable particles may be supplied to the material during the compounding stage.

Figure 5:
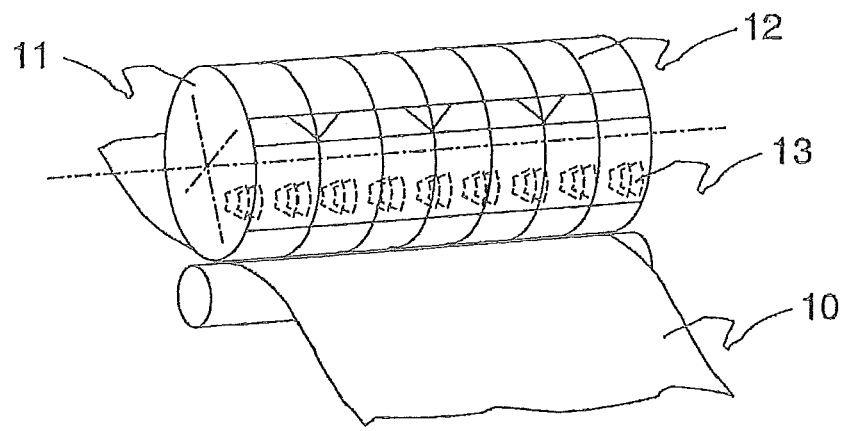
FIG. 5 shows a roller for creasing and magnetisation of a packaging laminate.
Figure 8:
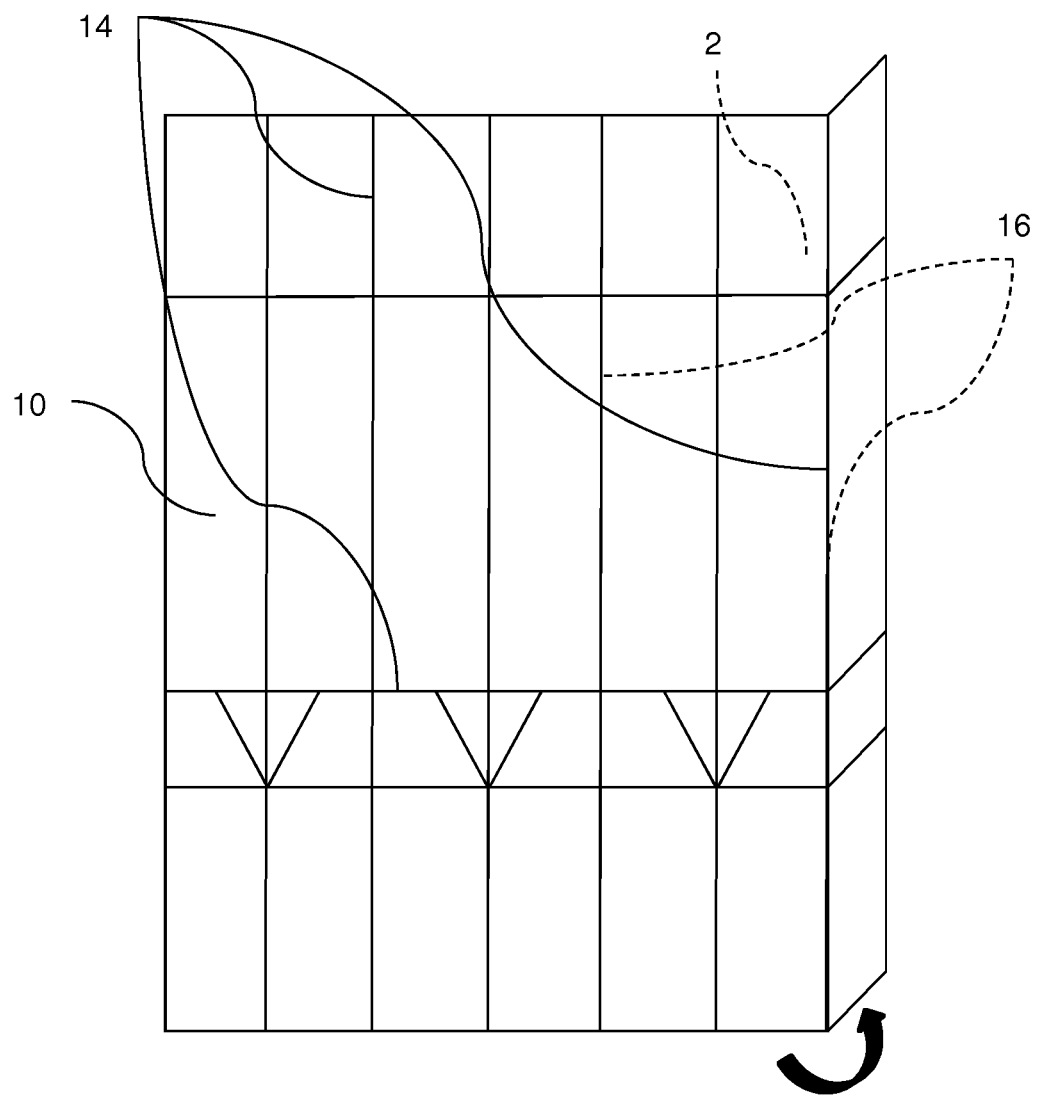
FIG. 8 shows a packaging laminate folded along one of a plurality of crease lines formed in the packaging laminate.

As is apparent from FIG. 5, the technique according to the present invention is suitable for simultaneous creasing and magnetisation of the magnetisable particles. The creasing roller 11 comprises a number of crease line pattern defining projections 12 which are disposed to crease the packaging laminate 10 and form crease lines 14 in the packaging laminate 10 as shown in FIG. 8. The roller further includes permanent or electromagnets 13 which are disposed locally to magnetise particles in the by-passing packaging laminate 10. FIG. 8 shows the packaging laminate 10 having crease lines 14 corresponding to the pattern of projections 12 on the creasing roller 11 as well as having magnetic guide markings 16 which result from the permanent or electromagnets 13 magnetizing some of the magnetisable particles in the by-passing packaging laminate 10. The resulting packaging laminate 10 can then be folded along the plurality of crease lines 14 based on the read information provided by the magnetized particles in the information layer 2, as shown in FIG. 8. The electromagnets 13 and the projections 12 accompany the roller 11 in its rotation and will, thus, be positioned in relation to one another with an extremely high degree of accuracy.

Figure 6:
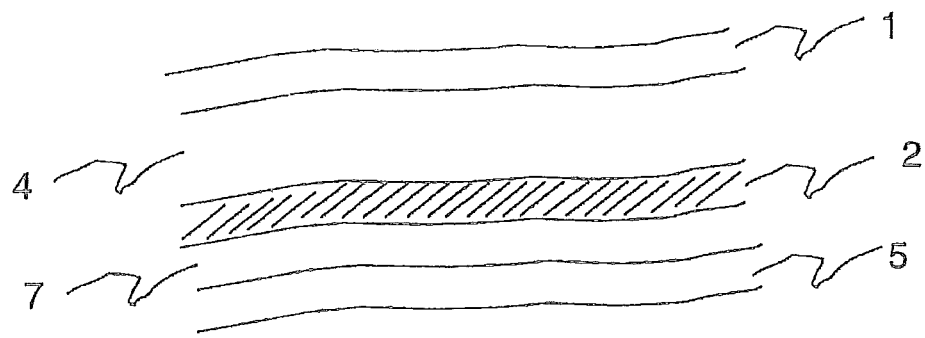
FIG. 6 shows a laminate structure for a rigid, fibre-based package adapted for non-refrigerated distribution.

According to a fifth embodiment, the packaging laminate includes, as is apparent from FIG. 6, from that side which is intended to constitute the outside of a finished package, a sealing layer 1 of, for example, PE, a core layer 4 of, for example, fibre-based material such as paper, an integrated information layer 2 of mineral-filled thermoplastic with admixed magnetisable particles, as well as an inner sealing layer 5 of, for example, PE. Moreover, between the inner sealing layer 5 and the information layer 2, the laminate is provided with a barrier layer 7, for example of aluminium. This packaging laminate is adapted for non-refrigerated distribution. According to an alternative embodiment, the packaging laminate includes the above-mentioned layers without the barrier layer 7. Such a packaging laminate is adapted for refrigerated distribution.

Figure 7:
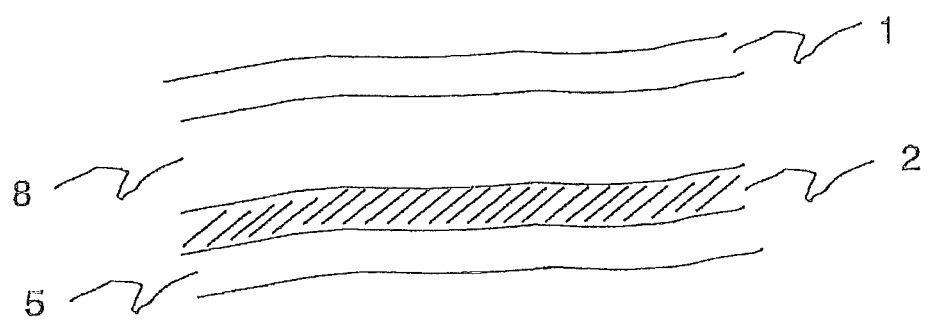
FIG. 7 shows a laminate structure for a bag-shaped package adapted for refrigerated distribution.

According to a sixth embodiment, the packaging laminate includes, as is apparent from FIG. 7, from that side which is intended to constitute the outside of a finished package, a sealing layer 1, for example of PE, a core layer 8 of mineral-filled polyolefin, an information layer 2 of mineral-filled thermoplastic with admixed magnetisable particles, as well as an inner sealing layer 5 of, for example, PE.

It will be realised that numerous modifications of the embodiments of the present invention described herein are possible without departing from the scope of the present invention.

For example, the PE film may be carrier of the magnetisable particles. In such instance, the present invention may be employed in connection with conventional packaging laminates which are employed today for fibre-based packages both for refrigerated and for non-refrigerated distribution.

Further, use may be made of other plastics, such as polyester (for example PET), or PA, or a fibre-based layer (e.g. paper layer) as carriers of the magnetic particles. With plastics such as PET or PA, the advantage will be afforded that, in certain cases, it is possible to add the magnetisable particles already in the polymerisation (in situ), in other words the compounding stage is obviated.

What is claimed is:

1. A method of controlling working operations on a packaging laminate in a filling machine comprising:
    supplying a packaging laminate to a filling machine, the packaging laminate comprising a plurality of material layers, at least one of the material layers included in the packaging laminate comprising a layer of fibre-based material and at least one other of the material layers comprising magnetizable particles admixed within each of the at least one other of the material layers, at least some of the magnetizable particles being magnetized to form magnetic guide markings which register with the filling machine a position of a plurality of crease lines formed in the packaging laminate;
    controlling working operations of the filling machine on the packaging laminate supplied to the filling machine by reading information provided by the magnetic guide markings; and
    folding the packaging laminate along the plurality of crease lines formed in the packaging laminate based on the position of the crease lines registered by the magnetic guide markings.

2. The method as claimed in claim 1, wherein the folding the packaging laminate results in a packaging container.

3. The method as claimed in claim 1, wherein the at least one other of the material layers comprising magnetizable particles is prefabricated to include the magnetizable particles such that the magnetizable particles are present in the packaging laminate prior to forming the packaging laminate into a packaging container.

4. The method as claimed in claim 1, wherein the at least one material layer comprising magnetizable particles is a layer including a matrix of plastic, the magnetizable particles being mixed in the matrix.

5. The method as claimed in claim 4, wherein the matrix is a thermoplastic.

6. The method as claimed in claim 5, wherein the thermoplastic is polyolefin plastic.

7. The method as claimed in claim 1, wherein a surface of the packaging laminate includes printed decorative artwork.

8. The method as claimed in claim 1, wherein the working operations of the filling machine include at least one of welding, punching, printing and folding.

9. A method of controlling working operations on a packaging laminate in a filling machine comprising:
    supplying a packaging laminate to a filling machine, the packaging laminate comprising a plurality of material layers including an innermost layer and an outermost layer, at least one of the material layers included in the packaging laminate comprising a layer of fibre-based material and at least one other of the material layers comprising admixed within each of the at least one other of the material layers, the at least one other of the material layers comprising magnetizable particles being between the innermost layer and the outermost layer, at least some of the magnetizable particles being magnetized to form magnetic guide markings which register with the filling machine a position of a plurality of crease lines formed in the packaging laminate; and
    controlling working operations of the filling machine on the packaging laminate supplied to the filling machine by reading information registered by the magnetic guide markings.

10. The method as claimed in claim 9, wherein the layer of fibre-based material is between the innermost layer and the outermost layer.

11. The method as claimed in claim 1, wherein the plurality of material layers further includes an innermost layer and an outermost layer, and the layer of fibre-based material is between the innermost layer and the outermost layer.

12. The method as claimed in claim 9, further comprising folding the packaging laminate along the plurality of crease lines formed in the packaging laminate based the position of the crease lines registered by the magnetic guide markings.

* * * * *